United States Patent Office 3,376,274
Patented Apr. 2, 1968

3,376,274
PHOSPHONATED POLYMERS
Nicodemus E. Boyer, Parkersburg, W. Va., and Raymond R. Hindersinn, Lewiston, N.Y., assignors to Hooker Chemical Corporation, Niagara Falls, N.Y., a corporation of New York
No Drawing. Continuation-in-part of application Ser. No. 260,832, Feb. 25, 1963. This application Feb. 27, 1967, Ser. No. 618,999
12 Claims. (Cl. 260—78.4)

ABSTRACT OF THE DISCLOSURE

Thermoset homopolymers and copolymers are produced from phosphonate esters having a plurality of unsaturated groups. The coplymers include another vinyl monomer. A typical phosphorus monomer is tetraallylphosphonosuccinate.

CROSS-REFERENCE TO RELATED APPLICATION

This is a continuation-in-part of copending application Ser. No. 260,832, filed Feb. 25, 1963, now abandoned.

BACKGROUND OF THE INVENTION

This invention relates to improved phosphorus-containing polymers and to a novel process for their preparation.

A large number of commercially available vinyl monomers have been utilized in preparing polymers of many and diverse end uses. While these polymers have many desirable and valuable properties which make them acceptable for many purposes, often they do have deficiencies, such as being of relatively low flame and weather resistance, poor light and heat stability, and changeable color. Therefore, the art has long sought a satisfactory process for improving one or more of these deficiencies while retaining the desirable properties of the polymer, thereby providing improved and commercially acceptable polymers.

Many organic phosphorus compounds with ethylenic unsaturation have been investigated without success for use in vinyl resins. Unsaturated phosphorus esters such as vinylphosphoric esters, triallyl phosphate, and triallyl phosphite are known to polymerize poorly in the presence of free radical catalysts. In many cases, even highly functional monomers do not yield hard cross-linked polymers. Although the unsaturated phosphorus esters do polymerize somewhat more readily than others, their tendency to chain transfer has generally prevented the preparation of high molecular weight copolymers or useful hard thermoset compositions.

It has now been discovered that vinyl monomers, whether occurring in nature or synthetic, can be reacted with the phosphorus monomers of this invention to produce phosphorus-containing copolymers, which retain many of the useful and desirable properties, e.g., moldability, cure characteristics, of the vinyl polymers and which also exhibit improved properties with respect to flame resistance, weather resistance, color stability, light stability, and heat stability, to a surprising extent. The resultant phosphonated copolymers are often much more satisfactory than the vinyl polymers now used, and the copolymers are also often useful in entirely different fields where the improved properties are desirable. Castings and laminates prepared from the phosphonated polymers of the present invention retain the desired properties of vinyl polymer products and exhibit the improved properties of the phosphonated products to an unexpected and surprising degree, making them useful in many new applications.

SUMMARY OF THE INVENTION

In accordance with this invention there is provided cross-linked phosphorus polymers containing the residues of a phosphorus monomer of the formula

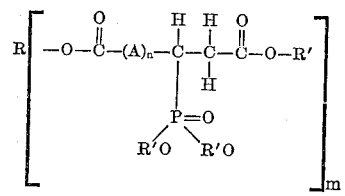

In the foregoing formula, A is a radical free of non-benzenoid unsaturation selected from the group consisting of alkyl, substituted alkyl, cycloalkyl, substituted cycloalkyl, aryl, alkylaryl and substituted aryl; R is a radical selected from the group consisting of aliphatic, aromatic and R'; R' is selected from the group consisting of vinyl, allyl, halo-substituted vinyl of the formula —CX=CH$_2$, and halo-substituted allyl of the formulas —CHX—CH=CH$_2$, —CH$_2$—CX=CH$_2$ and —CHX—CX=CH$_2$, wherein each X is selected from the group consisting of fluorine, chlorine and bromine; n is an integer from 0 to 1 and m is an integer from 1 to 10. The term non-benzenoid unsaturation as used in this specification describes unsaturation found in chemical structures other than benzene and its homologs. In the preferred embodiment, A contains from 1 to 10 carbon atoms. When R is aromatic, it is preferable that R contain 6 to 25 carbon atoms; however, when R is aliphatic, the preferred embodiment contains from 1 to 10 carbon atoms.

DESCRIPTION OF THE PREFERRED EMBODIMENTS

The phosphorus monomers may be conveniently prepared by reacting an alcohol and an α,β-unsaturated diacid, diacid halide or anhydride to form a half ester with respect to the acid, and further reacting the half ester with triolefinic phosphites according to the reaction shown below. (For the purposes of illustration only, the α,β-unsaturated reactant is represented by maleic anhydride.)

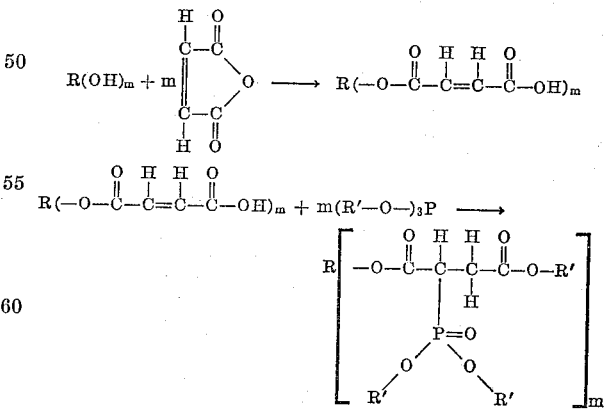

Typical phosphorus monomers which may be prepared according to the above reaction include, among others, those shown in the table below.

| Phosphorus monomer: | Short title |
|---|---|
| Tetraallylphosphonosuccinate | TAPS |
| Tetravinylphosphonosuccinate | TVPS |
| Tetra(α-chlorovinyl)phosphonosuccinate | TCVPS |
| Tetra(α-chloroallyl)phosphonosuccinate | TCAPS |
| 1,2 - ethanediol bis(triallylphosphonosuccinate) | EAPS |
| 1,2,3-propanetriol tris(triallylphosphonosuccinate) | GAPS |
| 1,3 - (2,2 - bischloromethyl)propanediolbis-(triallylphosphonosuccinate) | CPPS |
| 1,1'-isopropylidene bis(p - phenyleneoxy)di-2 - ethanol bis(triallylphosphonosuccinate) | EBAPS |

TAPS is prepared by reacting equivalent amounts of allyl alcohol and maleic anhydride and reacting the resulting half ester (with respect to the acid) with triallyl phosphite. In a similar fashion, EAPS is prepared by reacting ethylene glycol and maleic anhydride and further reacting with triallyl phosphite; GAPS is prepared by reacting glycerin and maleic anhydride and further reacting with triallyl phosphite; EBAPS is prepared by reacting 1,1'-isopropylidene bis(p-phenyleneoxy)di-2-ethanediol and maleic anhydride and further reacting with triallyl phosphite; CPPS is prepared by the reaction of 2,2-bischloromethyl-1,3-propanediol with maleic anhydride to form the partial ester which is then further reacted with triallyl phosphite. If desired, the foregoing phosphorus monomers may be prepared by using maleic acid or maleic diacid halide instead of the anhydride. Similar phosphorus monomers may be prepared by employing either the diacid halide, anhydride or acid forms of fumaric, methylmaleic, chloromaleic, bromomaleic, dichloromaleic, itaconic, glutaconic, 2-carboxycinnamic, 3-carboxycinnamic, 1-cyclohexenedicarboxylic and 3-cyclohexenedicarboxylic acids. For convenience, where possible, these phosphorus monomers will hereafter be referred to by their short titles. The polymers may be prepared from technical or practical grades of the phosphous monomers of this invention.

The hydroxyl containing compounds useful in preparing the phosphorus monomers of this invention include among others, but are not limited to glycol, propylene glycol, butylene glycol, hexanediol, allyl alcohol, diethylene glycol, glycerine, 1,1'-isopropylidene bis(p-phenyleneoxy)di-2-ethanediol, 1,1'-isopropylidene bis(p-phenyleneoxy)di-2-propanediol, and bisphenols.

Preparation of the phosphorus monomers of this invention is further illustrated by the detailed example of a typical process describing the preparation of EAPS.

Typical monomer preparation—EAPS

To a 3 liter 3-necked flask, equipped with a mechanical stirrer, thermometer and gas inlet tube, 372 parts (6.0 moles) of ethylene glycol and 1177 parts (12 moles) of maleic anhydride were added and the mixture was stirred at 120–140 degrees centigrade for 2 hours. The clear liquid product was then cooled to room temperature. It was tested and was found to have an acid number of 380. 2426 parts of triallyl phosphite (12 moles) were then added dropwise, with stirring, under a nitrogen atmosphere, over a 2½ hour period at a temperature of 60–80 degrees centigrade. An ice bath was used to maintain the temperature in the desired range. In some cases, the product was stirred at 80–140 degrees centigrade for an additional 1–2 hours after the completion of the addition of the phosphite to complete the reaction. The resulting liquid product had an acid number of 18.2. Instead of employing the above reactants, the same process can be employed to make the other mentioned partial esters, with the corresponding reactants.

The phosphorus monomers and momeric mixtures are polymerized, i.e., set or cured, to useful articles with the aid of free radicals. High energy radiation, actinic light, e.g., ultraviolet light, diazo compounds and peroxides are suitable initiators for free radical polymerization. The amount of free radicals required to obtain the desired state of cure varies depending on the results desired and the equipment to be used in obtaining the cure. The application of heat is desirable to increase the rate of cure.

It is convenient to describe the resulting phosphorus polymer composition in terms of residues of the phosphorus monomer. As the polymerization progresses, additional vinyl and/or allyl groups open to cross-link with other phosphorus monomer molecules. Therefore, the phosphorus monomer may be at any one of the total possible degrees of cross-linking when polymerization is halted. In the case of TAPS there are 4 possible degrees of cross-linking, CPPS has 6 possibilities, and GAPS has 9 possibilities. Hence, it is most convenient to think of the polymer in terms of what remains of the monomer structure after cross-linking rather than what is the actual cross-linked structure at the termination of polymerization.

The phosphorus monomers may be used either as homopolymers or copolymers with other vinyl monomers to prepare the useful invented products. In preparing copolymers, the phosphorus monomer or mixture of phosphorus monomers is added to the vinyl monomer in an amount necessary to impart the degree of enhancement of flame resistance or other desirable properties mentioned herein. The vinyl monomer may be blended with the phosphorus monomers in any desired proportion, however, the amount to achieve the same type of effect will vary with the vinyl or ethylenic unsaturated monomer selected for blending with the phosphorus monomer. Copolymers with very desirable heat and fire-resistant properties are obtained. Polymerization of the mixture of monomers is carried out under the same conditions as for the phosphorus monomer alone.

As noted above, many successful copolymers of phosphorus and vinyl monomers may be prepared. The proportion of phosphorus monomer to vinyl monomer may range from about 8 percent by weight of phosphorus in the copolymer to as little as about 0.5 percent. It is preferable, however, that the copolymer contain from at least about 2 to about 7 percent by weight of phosphorus to achieve the greater advantages of this invention.

The vinyl monomers useful in preparing copolymers with phosphorus monomers include the common ethylenically unsaturated compounds or mixtures thereof and usually they contain the reactive vinyl group $H_2C=C<$ and contain from 2 to 20 carbon atoms. Specific examples include styrene, α-methyl styrene, vinyl toluene, triallyl cyanurate, monochlorostyrene, dichlorostyrene, diallyl phthalate, diallyl maleate, unsaturated esters such as vinyl acetate, methyl methacrylate, methyl acrylate, allyl acetate, diallyl succinate, diallyl adipate, diallyl sebacate, diethylene glycol bis-allylcarbonate, and vinyl chloride, vinyl toluene, diallyl chloroendate, diallyl tetrachlorophtha late, the lower aliphatic esters other than methyl of methylacrylic and acrylic acids, such as ethylene glycol diacrylate, dimethylacrylate, diethylacrylate, and so forth, where the glycol contains from 2 to 6 carbon atoms.

The phosphorus monomers are readily polymerized by use of a free radical catalyst and heating at an elevated temperature until the desired degree of cross-linking has been obtained. The temperature selection is influenced by the chose of catalyst and the acceptable amount of discoloration for the article being molded. Generally, temperatures from room temperature, e.g., about 20 degrees centigrade, to about one hundred and sixty degrees centigrade are suitable and excellent cures may be obtained between fifty and one hundred and forty degrees centigrade. Time to achieve the desired degree of cure is dependent upon the temperature and the type and quantity of free radical catalyst employed. Also, it is possible to use cold-curing catalyst systems, i.e., catalytic systems which permit polymerization at ambient temperatures, for example, benzoyl peroxide or p-chlorobenzoyl peroxide in combination with (a) tertiary amines, such as triethylamine, diethylamine, (b) substituted hydrazines, or (c) organometallic compounds such as metallic drying salts, for example, cobalt naphthanate or cobalt octanoate. When bubble-free articles are desired, the manner of cross-linking the phosphorus monomers parallels the manner of cross-linking acrylic monomers, i.e., gradual step by step increases of temperature are made until the desired state of cure is obtained.

A convenient source of free radicals for curing the phosphorus monomers and blends of phosphorus monomers with vinylic unsaturated monomers is obtained by the use of an organic peroxide. These peroxides offer a variety of decomposition temperatures, half lifes, and organic residues. Based on the weight of the monomers present, the amount of peroxide added may be as low as about 0.01 percent and as high as about 5 percent by weight. Preferred and efficient cures may be obtained by using from about 0.1 to 2.0 percent. Greater amounts of active free radicals will produce shorter chain polymers. Suitable organic peroxides include alkylhydroperoxides, for example, tertiary butyl hydroperoxide, cumene hydroperoxide, diisopropylbenzene hydroperoxide, methane hydroperoxide, and paratertiarybutylcumene hydroperoxide, ditertiarybutyl peroxide, peroxide derivatives of aldehydes and ketones such as hydroxyheptaldehyde, dibenzoyl diperoxide, methylethyl ketone, methylisobutyl ketone, and cyclohexanone peroxide. Among the suitable diacyl peroxides are acetyl peroxide, lauryl peroxide, benzoyl peroxide, parachlorobenzoyl peroxide, and 2,4-dichlorobenzoyl peroxide; and peroxy esters such as tertiary butyl peracetate, tertiary butyl perbenzoate, ditertiary butyl, diisopropyl peroxydicarbamate, diperthalate and tertiary butyl permaleic acid.

Other convenient sources of free radicals for use with the monomers of this invention are the so called azo catalysts. Catalysts of this group are exemplified by the compound azo bis isobutyronitrile.

In accordance with still other aspects of this invention, it is possible to employ the phosphorus polymers of this invention in the preparation of plastic articles, reinforced plastic articles, and laminates or other filled resin compositions, and surprisingly, such materials exhibit vastly superior fire retardance and may even be rendered self extinguishing. Castings may also be prepared from the phosphorus polymers of the present invention and such products likewise may be found to exhibit fire retardance to a surprising degree and may be self extinguishing. In general, well known processes of the prior art may be used for preparing the above mixed plastic articles, reinforced plastic articles, laminates or other filler resin compositions, and castings, by substituting the phosphorus polymer of the present invention for the conventionally used vinyl unsaturated polymer.

Phosphorus polymer laminates of the invention may be press cured in the conventional manner. Typical examples of good cures include cure cycles of (a) 10 minutes at 80 degrees centigrade followed by 10 minutes at 120 degrees centigrade and (b) 30 minutes at 90 degrees centigrade followed by 30 minutes at 120 degrees centigrade. Usually, significant changes in fabrication processes are not necessary. It is generally preferred that a thermoset polymer be present in the finished article.

The following are examples of suitable reinforcing media that can be used with the polymers of the invention: glass fibers, glass mats, glass cloth, glass roving, synthetic fibers such as acrylonitrile fibers such as E. I. Du Pont de Nemours & Company's Orlon brand, mineral fibers such as asbestos, natural fibers such as cotton, silk, and wool, and metallic fibers such as aluminum and steel.

The following are examples of fillers that can be used in the polymers of the invention: inorganic materials such as calcium carbonate, clay and pigments such as zinc oxide, and organic materials such as wood flour, cotton and rayon flock, sisal fibers and dyes.

The foregoing detailed description and the following specific examples are for the purpose of illustration only, and not intended to limit the invention.

Example 1

A portion of benzoyl peroxide (0.32 part by weight) was added to 31.5 parts by weight of TAPS, practical grade, at room temperature and the mixture was stirred until the peroxide dissolved. Gelation occurred after heating for 65 hours at 100 degrees centigrade. Test specimens were prepared by pouring the resultant solution into molds and curing for 24 hours at 50 degrees centigrade, thereafter at 80 degrees centigrade for 26 hours, followed by 65 hours at one hundred degrees centigrade, after which the sample was cured for an additional 48 hours at one hundred twenty degrees centigrade. The resulting casting had a pale yellow color, Bardol hardness of 30, and, when tested in accordance with American Society for Testing Materials (ASTM) procedure D-757-49 for fire resistance, the sample was self extinguishing.

Tabulated below are other phosphorus homopolymers and various copolymers of vinyl and phosphorus monomers. The samples were prepared by blending the phosphorus monomer, catalyst and vinyl monomer, if present, together, poured into a mold, cured, and tested in the same manner as Example 1. It is to be noted that the concluding examples (21 through 26) are comparative examples.

| Example | Polymer Composition (parts by weight) | | Catalyst (parts) | Gel Time, Hrs. At °C. | Color | Hardness Bardol | Phosphorus, Percent | Burning Rate, ASTM D-757-49 | Heat Distortion, ASTM D-757-49, °C. | Cure Cycle |
|---|---|---|---|---|---|---|---|---|---|---|
| | Phosphorus [1] | Vinyl [2] | | | | | | | | |
| 1 | 31.5 TAPS | | 0.32 | 65-100 | Clear Pale Yellow. | 30 | 8.5 | Self Extinguishing | | (a) |
| 2 | 21.0 TAPS | 8.4-S | 0.3 | 20-80 | Almost Colorless. | 30 | 6.1 | Burns and melts | | (a) |
| 3 | 100.0 TAPS | 40.0-MMA | 1.4 | 19-50 | Colorless | 68 | 6.1 | 0.29 inch/min | | (e) |
| 4 | 21.0 TAPS | 4.2-S, 4.2-MMA | 0.2 | 20-80 | Almost Colorless. | 30 | 6.1 | Self Extinguishing | 140 | (a) |
| 5 | 15.0 TAPS | 6.0-DMF | 0.2 | 65-100 | Pale Yellow | 40 | 6.1 | Rapidly Self Ext. | | (a) |
| 6 | 100.0 TAPS | 100.0-MMA | 2.0 | 16-50 | do | 63 | 4.3 | 0.33 inch/min | 83 | (f) |
| 7 | 50.0 TAPS | 150.0-MMA | 2.0 | 24-80 | Yellow | 63 | 2.1 | 0.60 inch/min | 97 | (f) |
| 8 | 23.0 TAPS | 177.0-MMA | 2.0 | 24-80 | do | 60 | 1.0 | 0.72 inch/min | 95 | (f) |
| 9 | 100.0 TAPS | 30.0-MMA, 10-AA | 1.4 | 65-45 | Colorless | 51 | 6.1 | 0.33 inch/min | 40 | (b) |
| 10 | 100.0 TAPS | 80.0-MMA, 20-AA | 2.0 | 65-45 | do | 60 | 4.3 | | | (c) |
| 11 | 100.0 GAPS | 40.0-MMA | 1.4 | | | 47 | 6.7 | Self Extinguishing | | (d) |
| 12 | 100.0 EAPS | 40.0-MMA | 1.4 | | | 52 | 6.7 | do | | (d) |
| 13 | 100.0 EBAPS | 40.0-MMA | 1.4 | | | 50 | 4.9 | do | | (d) |
| 14 | 100.0 CPPS | | 1.0 | | | 60 | 8.1 | Immediately Self Ext. | | (g) |
| 15 | 100.0 GAPS | 40.0-S | 1.4 | | | 24 | 6.7 | | | (d) |
| 16 | 100.0 EAPS | 40.0-S | 1.4 | | | 41 | 6.7 | | | (d) |
| 17 | 100.0 EAPS | 30.0-MMA, 10.0-AA | 1.4 | 65-45 | Colorless | 65 | 6.6 | | | (c) |
| 18 | 100.0 EAPS | 80.0-MMA, 20-AA | 2.0 | 65-45 | do | 55 | 4.6 | 0.75 inch/min | 71 | (c) |
| 19 | 100.0 GAPS | 30.0-MMA, 10-AA | 1.4 | 65-45 | do | 59 | 6.6 | 0.71 inch/min | 78 | (c) |
| 20 | 100.0 GAPS | 80.0-MMA, 20-AA | 2.0 | 6-60 | do | 58 | 4.6 | | | (c) |

See footnote at end of table.

COMPARATIVE

| Example | Polymer Composition (parts by weight) | | Catalyst (parts) | Gel Time, Hrs. At °C. | Color | Hardness Bardol | Phosphorus, Percent | Burning Rate, ASTM D-757-49 | Heat Distortion, ASTM D-757-49, °C. | Cure Cycle |
|---|---|---|---|---|---|---|---|---|---|---|
| | Phosphorus [1] | Vinyl [2] | | | | | | | | |
| 21 | 100.0 Triallyl Phosphate. | 40.0-MMA | 1.4 | | | 0 | | | | (d) |
| 22 | 100.0 Triallyl Phosphite. | 40.0-MMA | 1.4 | | | 0 | | | | (d) |
| 23 | 100.0 Triallyl Phosphate. | 40.0-S | 1.4 | | | 0 | | | | (d) |
| 24 | 100.0 Triallyl Phosphite. | 40.0-S | 1.4 | | | 0 | | | | (d) |
| 25 | | 22.0-MMA | 0.22 | 19-50 | White | 55 | 0 | Burns | | (a) |
| 26 | | 22.0-S | 0.22 | 20-80 | Pale Yellow | 43 | 0 | do | | (a) |

[1] Phosphorus Monomer Code: See table in column 3.
[2] Vinyl Code:
  AA—Acrylic Acid.
  DMF—Dimethyl Fumarate.
  MMA—Methyl Methacrylate.
  S—Styrene.
Cure Cycle:
  (a) 24 hrs. at 50° C., 26 hrs. at 80° C., 65 hrs. at 100° C., 48 hrs. at 120° C.
  (b) 65 hrs. at 45° C., 24 hrs. at 60° C., 8 hrs. at 80° C., 15 hrs. at 100° C., 8 hrs. at 120° C.
  (c) 65 hrs. at 45° C., 24 hrs. at 60° C., 8 hrs. at 80° C., 21 hrs. at 100° C., 14 hrs. at 120° C.
  (d) 66 hrs. at 80° C., 24 hrs. at 100° C., 8 hrs. at 120° C., 16 hrs. at 140° C.
  (e) 24 hrs. at 50° C., 24 hrs. at 80° C., 24 hrs. at 100° C., 64 hrs. at 120° C.
  (f) 24 hrs. at 50° C., 24 hrs. at 80° C., 16 hrs. at 100° C., 8 hrs. at 120° C.
  (g) 16 hrs. at 80° C., 4 hrs. at 120° C., 4 hrs. at 140° C.

From the above table it will be seen that various copolymers may be prepared to provide the exact balance of properties desired in respect to hardness, first resistance, heat distortion temperatures, and color that may be desired for a particular article of manufacture.

Various changes and modifications may be made and equivalents may be substituted in the method and composition of this invention, certain preferred forms of which have been herein described, without departing from the scope of this invention. Such modifications are to be regarded as within the scope of this invention.

We claim:
1. A thermoset homopolymer of a phosphorus monomer of the formula

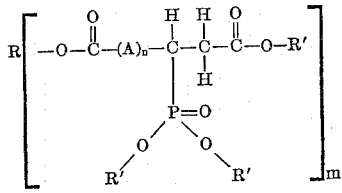

where A is a radical free of non-benzenoid unsaturation, containing from 1 to 10 carbon atoms, and selected from the group consisting of alkyl, halo-substituted alkyl, cycloalkyl, halo-substituted cycloalkyl, aryl, halo-substituted aryl, and alkylaryl; R is a radical selected from the group consisting of aliphatic radical of 1 to 10 carbon atoms, aromatic radical of 6 to 25 carbon atoms, and R'; R' is selected from the group consisting of vinyl, allyl, halo-substituted vinyl of the formula $—CX=CH_2$, and halo-substituted allyl of the formulas $—CHX—CH=CH_2$, $—CH_2—CX=CH_2$ and $—CHX—CX=CH_2$, wherein each X is selected from the group consisting of fluorine, chlorine and bromine; $n$ is an integer from 0 to 1 and $m$ is an integer from 1 to 10, said homopolymer being polymerized and cross-linked through the unsaturated R' groups of said phosphorus monomer.

2. A homopolymer according to claim 1 wherein the phosphorus monomer is tetraallylphosphonosuccinate.

3. A homopolymer according to claim 1 wherein the phosphorus monomer is 1,2-ethanediol bis(triallylphosphonosuccinate).

4. A homopolymer according to claim 1 wherein the phosphorus monomer is 1,2,3-propanetriol tris(triallylphosphonosuccinate).

5. A homopolymer according to claim 1 wherein the phosphorus monomer is 1,3(2,2-bischloromethyl)propanediol bis (triallylphosphonosuccinate).

6. A homopolymer according to claim 1 wherein the phosphorus monomer is 1,1'-isopropylidene bis(p-phenyleneoxy)di-2-ethanol bis(triallylphosphonosuccinate).

7. A thermoset copolymer of (I) a phosphorus monomer of the formula

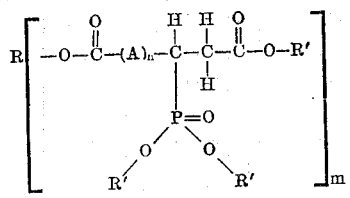

where A is a radical free of non-benzoid unsaturation, containing from 1 to 10 carbon atoms, and selected from the group consisting of alkyl, halo-substituted alkyl, cycloalkyl, halo-substituted cycloalkyl, aryl, halo-substituted aryl, and alkylaryl; R is selected from the group consisting of aliphatic radical of 1 to 10 carbon atoms, aromatic radical of 6 to 25 carbon atoms, and R'; R' is selected from the group consisting of vinyl, allyl, halo-substituted vinyl of the formula $—CH=CH_2$, and halo-substituted allyl of the formulas $—CHX—CH=CH_2$, $$—CH_2—CX=CH_2$$

and $—CHX—CX=CH_2$, wherein each X is selected from the group consisting of fluorine, chlorine and bromine; $n$ is an integer from 0 to 1 and $m$ is an integer from 1 to 10, and (II) a vinyl monomer containing the vinyl group $H_2C=C<$; said copolymer being polymerized and cross-linked through the unsaturated R' groups of said phosphorus monomer and the vinyl groups of said vinyl monomer.

8. A copolymer according to claim 7 wherein the phosphorus monomer is tetraallylphosphonosuccinate.

9. A copolymer according to claim 7 wherein the phosphorus monomer is 1,2-ethanediol bis(triallylphosphonosuccinate).

10. A copolymer according to claim 7 wherein the phosphorus monomer is 1,2,3-propanetriol tris (triallylphosphonosuccinate).

11. A copolymer according to claim 7 wherein the phosphorus monomer is 1,3-(2,2-bischloromethyl)propanediol bis(triallylphosphonosuccinate).

12. A copolymer according to claim 7 wherein the phosphorus monomer is 1,1'-isopropylidene bis(p-phenyleneoxy)di-2-ethanol bis(triallylphosphonosuccinate).

References Cited

UNITED STATES PATENTS 2,973,380  2/1961  Svern _____ 260—920
3,196,190  7/1965  Nischk et al. _____ 260—920

JOSEPH L. SCHOFER, *Primary Examiner.*

J. KIGHT, *Assistant Examiner.*